United States Patent [19]

Kumagai

[11] Patent Number: 5,075,872
[45] Date of Patent: Dec. 24, 1991

[54] METHOD FOR CONVERTING A MULTIPLE-DENSITY IMAGE INTO A BINARY DENSITY IMAGE

[75] Inventor: Ryohei Kumagai, Tokyo, Japan

[73] Assignee: Ezel, Inc., Tokyo, Japan

[21] Appl. No.: 572,335

[22] Filed: Aug. 24, 1990

Related U.S. Application Data

[63] Continuation of Ser. No. 323,030, Mar. 14, 1989, abandoned.

[30] Foreign Application Priority Data

Apr. 11, 1988 [JP] Japan ................................. 63-88484

[51] Int. Cl.$^5$ ............................................. G06K 9/38
[52] U.S. Cl. ...................................... 395/132; 382/51; 358/465
[58] Field of Search ................ 364/518, 521; 358/465, 358/466, 447, 457; 382/50, 51

[56] References Cited

U.S. PATENT DOCUMENTS

| | | | |
|---|---|---|---|
| 4,601,057 | 7/1986 | Tsuji et al. ............................. | 382/51 |
| 4,656,665 | 4/1987 | Pennebaker ............................ | 382/51 |
| 4,710,822 | 12/1987 | Matsunawa .......................... | 358/466 |
| 4,742,557 | 5/1988 | Ma ....................................... | 382/51 |
| 4,791,678 | 12/1988 | Iwase et al. ............................ | 382/54 |
| 4,847,786 | 7/1989 | Wang et al. ....................... | 382/51 X |

OTHER PUBLICATIONS

Campbell and Dierker, *Calculus with Analytic Geometry*, 2nd Edition, 1978, pp. 122–127.

Primary Examiner—Gary V. Harkcom
Assistant Examiner—Michael A. Jaffe
Attorney, Agent, or Firm—Cushman, Darby & Cushman

[57] ABSTRACT

An apparatus converts a multi-density image into a binary value image by converting pixels with densities above a threshold to a first value and pixels below a threshold to a second value. The apparatus generates a histogram relating image densities with the numbers of pixels having those densities. A first memory holds the image pixel densities. A second memory has address inputs attached to the data outputs of the first memory. Addresses of the second memory correspond to image densities. As a pixel is read out of the first memory, its density value serves as an address for a location in the second memory, and a count stored in that address is incremented. After reading all of the pixels from the first memory and incrementing counts, the second memory holds a histogram of the image. The apparatus evaluates the histogram to identify a density for which the number of pixels in the image is a local minimum. The local minimum is selected as the threshold. The apparatus begins with a density having a maximum number of pixels, and evaluates densities in increasing or decreasing order. Densities are evaluated rapidly under a first condition until the numbers of pixels approach a local minimum. Then a second condition is used to evaluate densities until selecting a threshold.

2 Claims, 2 Drawing Sheets

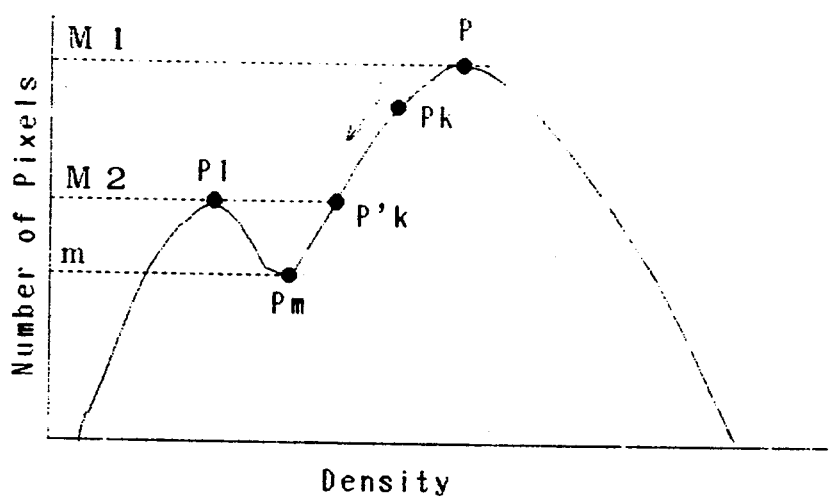

METHOD FOR CONVERTING A MULTIPLE-DENSITY IMAGE INTO A BINARY DENSITY IMAGE

This is a continuation of application Ser. No. 323,030, filed Mar. 14, 1989, which is now abandoned.

FIELD OF THE INVENTION

The present invention relates to an image processing method and apparatus wherein a local minimum of a histogram of an image is calculated.

BACKGROUND OF THE INVENTION

The "mode method" is well-known as an effective method for determining a threshold in binarizing. In the mode method, a local minimum is to be found between a couple of local maximums. For finding the local minimum, $L^3$ comparisons are necessary where the number of levels of the histogram is L. The comparison takes a lot of process time.

SUMMARY OF THE INVENTION

Therefore, the present invention has an object to provide an image processing method by which the threshold is calculated in a much shorter time than the conventional method.

According to the present invention, the density b which maximizes the following formula is found.

$$(Na-Nb)\times(Nc-Nb)$$

a: Density higher than b;
c: Density lower than b;
Na: Number of pixels of density a in a histogram;
Nb: Number of pixels of density b in a histogram;
Nc: Number of pixels of density c in a histogram.

The density, a, corresponds to a local maximum of higher density in the histogram and the density c corresponds to a local maximum of lower density. The density b corresponds to a local minimum to be deemed to be the optional threshold. For finding the densities, a, b and c, a table of density is generated first in the order of number of pixels having each density. The density having the maximal number of pixels is assumed to be the density of the local maximum of either the higher or lower density; that is, a or c. When it is assumed to be the local maximum, a, of higher density, two other densities are assumed to be densities b and c, where $b<=a$ and $c<=b$. The densities b and c are initially selected from densities having higher numbers of pixels then gradually from densities having lower numbers of pixels. For each assumption of a, b and c, the formula $(Na-Nb)\times(Nc-Nb)$ is calculated. The densities a, b and c which give the maximum value of $(Na-Nb)\times(Nc-Nb)$ are finally selected as the local maximums and the local minimum.

BRIEF DESCRIPTION OF THE DRAWINGS

FIG. 1 shows a histogram of an image;
FIG. 2 shows a table corresponding to the histogram of FIG. 1;
FIG. 3 shows a table in the order of number of pixels generated from the table in FIG. 2.

PREFERRED EMBODIMENTS OF THE PRESENT INVENTION

Figure 4:
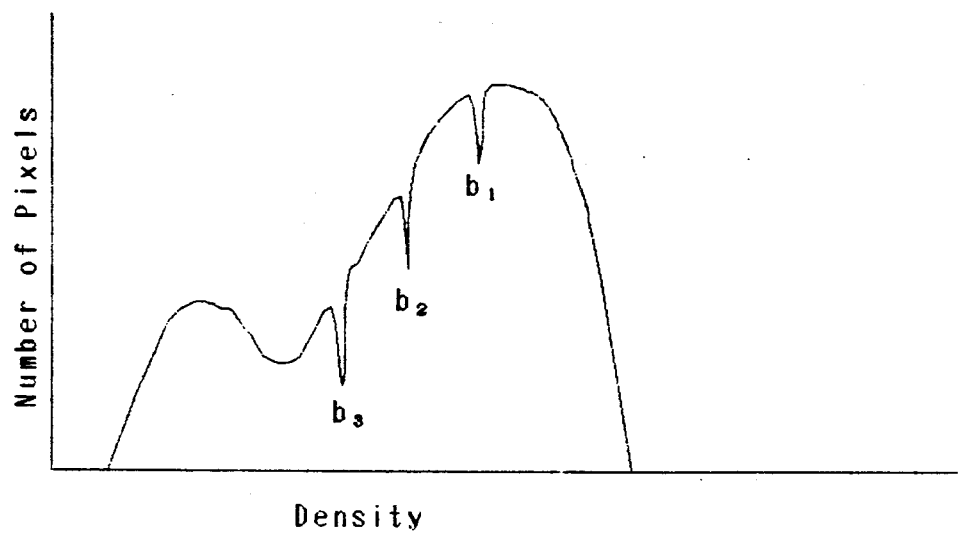
FIG. 4 shows a histogram to be flattened.

Exemplary preferred embodiments of the image processing method according to the present invention will be described in detail hereinafter with reference to the figures.

FIG. 1 shows a histogram of an image, wherein local maximums M1 and M2 and a local minimum rather clearly appear. The local maximum and the local minimum are not so clear in a practical image. FIG. 1 is merely an example for description and easy understanding.

FIG. 2 shows a table of number of pixels having a given density arranged according to the order of density and corresponding to the histogram in FIG. 1. The table of FIG. 2 is converted to the table of FIG. 3 according to the present invention. The table in FIG. 3 shows densities for which the image has a given number of pixels arranged according to the order of number of pixels. The table of FIG. 3 is generated by sorting the table of FIG. 2. The density having the maximal number of pixels is the density giving one of the local maxima. With respect to the histogram in FIG. 1, the density having the maximal number of pixels is the density giving the local maximum M1. Here, the density having the maximal number of pixels can be assumed to be the density giving the local maximum of either higher density or lower density. The processing which follows depends upon which of the local maxima is assumed.

a) The processing when the density having the maximal number of pixels is assumed to be the local maximum of higher density: N0 is assumed to be M1.

In the table of FIG. 3 the numbers of pixels are arranged from the maximum N0 to the minimum Nn, to which the densities D0, D1, . . . , Dn correspond, respectively.

From N0 to Nn, the maximal Nk is identified whose density Dk is lower than D0: $D0>Dk$. Nk is conditionally assumed now to be the local minimum m. Then $(N0-Nk)$ is calculated and registered. Next the maximal Nl is searched under the condition that $Dk>Dl$ as well as $Nk<Nl$. Nl is assumed now to be the local maximum of lower density M2. Then, $$Xkl=(N0-Nk)\times(Nl-Nk)$$

is calculated and registered. Furthermore, another point having density Dl' is conditionally evaluated as the lower local maximum M2. This maximal Nl' under the conditions that $Dl>Dl'$ as well as $Nl<Nl'$ is found. The value of $$Xkl'=(N0-Nk)\times(Nl'-Nk)$$

is calculated and compared with Xkl, where:

$$Xkl=(N0-Nk)\times(Nl-Nk)$$

When $Xkl'>=Xkl$, Xkl' is newly registered, replacing Xkl with Xkl'.

Hereafter, a set of points Nl(n) are searched as long as the following relationship occurs.

$$(N0-Nk)\times(Nl^{(n)}-Nk)<(N0-Nk)\times(Nl^{(n+1)}-Nk)$$

The maximal value of Xkl caused by $Nl^{(n)}$ is finally registered.

After searching the set of $Nl^{(n)}$ for one conditional Nk, Nk is successively changed. The nth Nk is defined as $Nk^{(n)}$, the density thereof is defined as $Dk^{(n)}$. $Nk^{(n)}$ is selected under the condition that $Dk^{(n-1)} > Dk^{(n)}$ as well as $Nk^{(n-1)} > Nk^{(n)}$. For each $Nk^{(n)}$, a set of points $Nl^{(n)}$ is evaluated similarly to the processing above.

As shown in FIG. 1, when the assumption NO=M1 is correct, that is, the point P is the local maximum of higher density, the point Pk assumed to give Nk is moved gradually toward the point Pm. A point Pl assumed to be a local maximum of lower density cannot be found until the assumed point Pk reaches the point Pk' with same number of pixels as Pl. Until Pk' is assumed to be the minimum, there is no point with a lower density as well as with a higher number of pixels. Therefore, the calculation of Xkl is not executed, and the calculation time is economized.

b) The processing when the density having the maximal number of pixels is assumed to be the local maximum of lower density: NO is assumed to be M2.

From NO to Nn, the maximal Nk is identified whose density Dk is higher than D0: D0>Dk. Nk is conditionally assumed now to be the local minimum m. Then (NO−Nk) is calculated and registered. Next the maximal Nl is searched under the condition that Dk<Dl as well as Nk<Nl. Nl is assumed now to be the local maximum of higher density M1. Then, $$Xkl = (NO - Nk) \times (Nl - Nk)$$

is calculated and registered. Furthermore, another point having density Dl' is evaluated as the higher local maximum M1. This maximal Nl' under the conditions that Dl<Dl' as well as Nl<Nl' is found. The value of $$Xkl' = (NO - Nk) \times (Nl' - Nk)$$

is calculated and compared with Xkl, where $$Xkl = (NO - Nk) \times (Nl - Nk)$$

when Xkl' >=Xkl, Xkl' is newly registered, replacing Xkl with Xkl'.

Hereafter, a set of points Nl(n) are searched as long as the following relationship occurs:

$$(NO - Nk) \times (Nl^{(n)} - Nk) < (NO - Nk) \times (Nl^{(n+1)} - Nk)$$

The maximal value of Xkl caused by $Nl^{(n)}$ is finally registered.

After searching the set of Nl(n) for one conditional Nk, Nk is successively changed. The nth Nk is defined as $Nk^{(n)}$, the density thereof is defined as $Dk^{(n)}$. $Nk^{(n)}$ is selected under the condition that $Dk^{(n-1)} < Dk^{(n)}$ as well as $Nk^{(n-1)} > Nk^{(n)}$. For each $Nk^{(n)}$, a set of points $Nl^{(n)}$ is evaluated similarly to the processing above.

In the histogram of FIG. 1, the assumption of NO=M2 is incorrect. There is no point giving Nl under the condition that Nk<Nl as well as Dk<Dl. Therefore, the searching of Nk and Nl is rapidly executed without finding suitable Nk and Nl. So NO is easily found not to be M2.

In the above searching, a set of points $Nl^{(n)}$ is searched for each assumption of Nk. It is also possible to search of a set of points $Nk^{(n)}$ for each assumption of Nl, that is, a number of pixels in FIG. 2 are successively assumed to be Nl, and $Nk^{(n)}$ are searched for each assumption of Nl.

As for the searching direction, both of the directions from lower density to higher density and from higher density to lower density can be applied.

After the processing of a) and b), the density giving Pm under the correct assumption is selected as the threshold for binarizing.

In a practical image, there are usually spiky drops in a histogram as shown in FIG. 4. In FIG. 4, drops are represented by references b1, b2 and b3. Such drops cause incorrect local minima. It is better to smooth the histogram before the processing according to the present invention.

Figure 5:
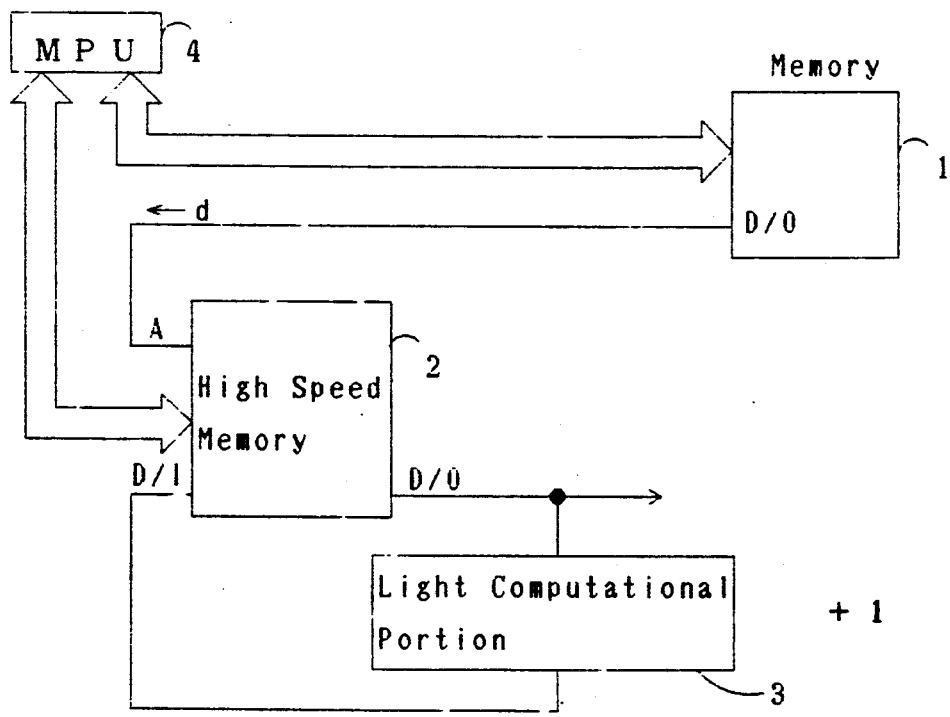
FIG. 5 shows a block diagram effective for the processing according to the present invention.

FIG. 5 shows a block diagram effective for processing an image according to the present invention.

In FIG. 5, a frame memory 1 is connected to an address input A of a high speed memory 2. The high speed memory 2 is provided with a feed back line from a data output D/O to a data input D/I through a light computational portion 3. An image to be processed is stored in the frame memory 1 first. The density d of each pixel of the image is output from data output D/O of the memory 1 to the address input A of the high speed memory 2. The high speed memory 2 is initialized first, and data "0" is stored in each address.

When the density d is input, the high speed memory 2 outputs the data stored in the address designed by the density d. Data output from memory 2 is input to the light computational portion 3 and increased by "1" therein. The increased data is fed back to the data input D/I and stored again in the address of d. Since the data in the high speed memory 2 is increased by "1" on each input of d, the number of pixels of each density d is incremented and stored in the address d of the high speed memory 2. Thusly, a histogram is generated.

The memory 2 comprises, for example, a high speed static RAM (random access memory). It is possible to increase the data in the high speed memory 2 synchronously with each output from the frame memory 1. The histogram is generated within one scanning of the image. When a static RAM of process speed of about 40 nsec/pixel is used, an image size of 512×512 pixels can be processed in 1/60 sec: in a video rate. For high speed processing, the frame memory 1 should also be high speed. As a high speed frame memory, a serial accessible memory such as dual-port memory is applicable.

When histogram generation is completed, the data in the high speed memory 2 is read by an MPU 4. The MPU 4 designates addresses of the frame memory 1 as the number of pixels stored in the high speed memory 2 and writes the density d (address of the high speed memory) in the corresponding address of the frame memory 1. The data in the frame memory can be deemed to be the table in FIG. 3, when data is reviewed according to the order of address.

There is a possibility that different densities have the same number of pixels. Such a problem may be easily solved by managing the overlapping of number of pixels.

Although only a few exemplary embodiments of this invention have been described in detail above, those skilled in the art will readily appreciate that many modifications are possible in the exemplary embodiments without materially departing from the novel teachings and advantages of this invention.

Accordingly, all such modifications are intended to be included within the scope of this invention as defined in the following claims.

What is claimed is:

1. An apparatus for converting a multi-density image into a binary value image comprising:

input means for receiving an image in the form of pixel density values, said input means including first digital memory means for storing pixel density values, said input means having a data input for receiving pixel density values and having a data output;

counting means for generating a histogram of counts of the numbers of pixels in the received image having each density value;

means for binarizing the received image by replacing pixel densities in the received image which are greater than a threshold with a first binary value, and for replacing pixel densities which are less than the threshold with a second binary value; and processing means for selecting a threshold from the received image, said processing means including:

maximum identification means for identifying a density $D_o$ for which the number of pixels $N_o$ in the image is the greatest;

series identification means for identifying a series of points $P_k^{(n)}$ in the histogram, each having a density $D_k^{(n)}$ less than $D_o$, each having a density less than the density $D_k^{(n-1)}$ of the previous point in the series, and each having a number of pixels $N_k^{(n)}$ less than the number of pixels $N_k^{(n-1)}$ of the previous point in the series;

set identification means for identifying a set of points $P_l^{(n)}$ associated with each point $P_k^{(n)}$ in the series, each point in the set having a density $D_l^{(n)}$ less than the density $D_k^{(n)}$ of the associated point in the series, and each point $P_l^{(n)}$ in the set having a number of pixels $N_l^{(n)}$ greater than number $N_k^{(n)}$ of the associated point in the series;

means for determining a set of values $X_{kL}^{(n)}$ for each point $P_k^{(n)}$ in the series where:

$$X_{kL}^{(n)} = (N_o - N_k^{(n)}) \times (N_l^{(n)} - N_k^{(n)});$$

threshold selection means for selecting, as the threshold, the density $D_k^{(n)}$ corresponding to the point $P_k^{(n)}$ for which $X_{kL}^{(n)}$ is greatest, thereby maximizing the expression:

$$(N_a - N_b) \times (N_e - N_b)$$

where:
$N_a$ is the number of pixels of the higher local maximum,
$N_b$ is the number of pixels of the threshold density b, and
$N_c$ is the number of pixels of the lower local maximum;

wherein said counting means includes:
(1) second digital memory means for storing, for each of a plurality of density values, counts of the numbers of pixels output from the first digital memory means having each density value, said second digital memory means having an address input connected to the data output of the first digital memory means, and having a data input and a data output; and
(2) incrementing means for incrementing counts of pixels stored in the second digital memory means while pixel density values are output from the first digital memory means, said incrementing means having an input connected to the data output of the second memory means and having an output connected to the data input of the second memory means.

2. An apparatus for converting a multi-density image into a binary value image comprising:

input means for receiving an image in the form of pixel density values said input means including first digital memory means for storing pixel density values, said input means having a data input for receiving pixel density values and having a data output;

counting means for generating a histogram of counts of the numbers of pixels in the received image having each density value;

means for binarizing the received image by replacing pixel densities in the received image which are greater than a threshold with a first binary value, and for replacing pixel densities which are less than the threshold with a second binary value; and processing means for selecting a threshold from the received image, said processing means including:

maximum identification means for identifying the density $D_o$ for which the number of pixels $N_o$ in the image is the greatest;

series identification means for identifying a series of points $P_k^{(n)}$ in the histogram, each having a density $D_k^{(n)}$ greater than $D_o$, each having a density $D_k^{(n)}$ greater than the density $D_k^{(n-1)}$ of the previous point in the series, and each having a number of pixels $N_k^{(n)}$ less than the number of pixels $N_k^{(n-1)}$ of the previous point in the series;

set identification means for identifying a set of points $P_l^{(n)}$ associated with each point $P_k^{(n)}$ in the series, each point in the set having a density $D_l^{(n)}$ greater than the density $D_k^{(n)}$ of the associated point in the series, and each point $P_l^{(n)}$ in the set having a number of pixels $N_l^{(n)}$ greater than the number of pixels $N_{k(n)}$ of the associated point in the series;

means for determining a set of values $X_{kL}^{(n)}$ for each point $P_k^{(n)}$ in the series where:

$$X_{kL}^{(n)} - (N_o - N_k^{(n)}) \times (N_l^{(n)} - N_k^{(n)});$$

threshold selection means for selecting, as the threshold, the density $D_k^{(n)}$ corresponding to the point $P_k^{(n)}$ for which $X_{kL}^{(n)}$ is greatest, thereby maximizing the expression:

$$(N_a - N_b) \times (N_c - N_b)$$

where:
$N_a$ is the number of pixels of the higher local maximum,
$N_b$ is the number of pixels of the threshold density b, and
$N_c$ is the number of pixels of the lower local maximum;

wherein the counting means includes:
second digital memory means for storing, for each of a plurality of density values, counts of the numbers of pixels output from the first digital memory means having each density value, said second digital memory means having an address input connected to the data output of the first digital memory means, and having a data input and a data output; and incrementing means for incrementing counts of pixels stored in the second digital memory means while pixel density values are output from the first digital memory means, said incrementing means having an input connected to the data output of the second memory means and having an output connected to the data input of the second memory means.

* * * * *